(12) United States Patent
Castellani et al.

(10) Patent No.: US 6,356,625 B1
(45) Date of Patent: Mar. 12, 2002

(54) ENVIRONMENT MONITORING TELEPHONE NETWORK SYSTEM

(75) Inventors: Franco Castellani, Ancona; Nicola Dell'Aquila, Falconara Marittima, both of (IT)

(73) Assignee: Telecom Italia S.p.A., Turin (IT)

( * ) Notice: Subject to any disclaimer, the term of this patent is extended or adjusted under 35 U.S.C. 154(b) by 0 days.

(21) Appl. No.: 09/439,344

(22) Filed: Nov. 15, 1999

(30) Foreign Application Priority Data

Nov. 13, 1998 (IT) ........................ RM98A0709

(51) Int. Cl.$^7$ .................. H04M 1/24; H04M 3/08; H04M 3/22
(52) U.S. Cl. .............. 379/32.01; 379/2; 379/9; 379/14.01; 379/15.05; 370/245
(58) Field of Search ............... 379/1, 6, 9, 10, 379/12, 14, 15, 22, 24, 28, 29, 32, 33, 34, 2; 370/242, 244, 245, 250

(56) References Cited

U.S. PATENT DOCUMENTS 4,980,913 A * 12/1990 Skret .................. 380/23
5,175,765 A * 12/1992 Perlman .................. 380/30
5,854,824 A * 12/1998 Bengal et al. ................ 379/34

* cited by examiner

Primary Examiner—Binh Tieu
(74) Attorney, Agent, or Firm—Young & Thompson

(57) ABSTRACT

An environment monitoring telephone network system comprises:
- a plurality M of environment parameters detecting and transmitting units (16), which transmit data toward the remote acquisition exchange (7), said units being provided with N analog input sensors;
- at least a telephone network private line, in order to transmit detected data to the remote acquisition exchange, where a Data Logger (5) is located, and to supply remotely the detecting and transmitting unit;
- a plurality M of receiving units (18), each interconnected with a specific detecting and transmitting unit, said receiving units being located at the remote acquisition exchange and being linked with the input channels of a Data Logger, which in turn is linked, by means of a modem, to a storing and processing center, through a switched telephone network (6).

8 Claims, 5 Drawing Sheets

ENVIRONMENT MONITORING TELEPHONE NETWORK SYSTEM

This invention refers generally to the environmental parameters acquisition technique and more particularly it relates to a telephone network system which allows the infrastructures of a telephone network, —which could be public or private, geographic or local—, to set up means by which data acquired by environment parameters detecting devices, widespread on the territory, are transmitted.

The known embodiments of an atmospheric monitoring network comprise some measurement boxes which contain a sensor set (polluting substances analyser, meteo sensors) and the Data Logger (an intelligent apparatus collecting the measures provided by the sensor set), usually connected by modem through a commutated telephone line to a Storing and Processing Data Centre (a Personal Computer with a network management software).

Physically the sensor system is installed in some cabinets in which also the Data Logger transmitting data through a commutated telephone line to the Storing Data Centre, is comprised.

Therefore an element characterizing the monitoring system according to the known art, is the proximity between the sensor set and the Data Logger, always located together on a single unit.

The more evident disadvantage of this apparatus is the one to one relation between the group of sensors placed into a specific location and the relative Data Logger. However, the latter is potentially provided with means which enable one to aquire data from many groups of sensors placed on the territory in such a way as to carry out a capillary monitoring.

On the other hand a basic problem of remote monitoring acquisition devices arises from the power supply of the latter. Since it is necessary to work with remote supply detection apparatus, it is obvious that the distance to be covered would reduce drastically the power available originally at the exchange, even if the detection devices were made using low-power devices and circuits to minimize the consumption.

It's an object of this invention to provide an environmental monitoring network with a centralized Data Logger that makes use of the telephone system infrastructures which could be public or private, geographic or local, for an operative connection with a remote sensor set in such a way as to remove the physical proximity constraint between the sensor set and the Data Logger, and to provide more detecting locations managed by only one acquisition apparatus.

A further object of this invention is to provide a telephone network environment monitoring system in which a remote supply of environmental acquisition apparatus can be achieved by the telephone exchange also over a very long distance.

Finally the object of this invention is to provide a telephone network environment monitoring system which uses devices, constituent parts and communication protocols of standard use in the field of telecommunications in order to provide a low cost, easy maintenance apparatus.

These and others objects which will be clear in the following description, are obtained through an environment monitoring telephone network system which comprises:

- a plurality M of environment parameter detecting and transmitting units used to transmit data to the remote acquisition exchange, each of said units being provided with N analog input sensors;
- at least, a telephone network private line for each detecting and transmitting unit, in order to transmit detected data to the remote acquisition exchange where is located a Data Logger and to supply remotely the detecting and transmitting unit;
- a plurality M of receiving units, each one is provided for the interconnection with a specific detecting and transmitting unit, placed at the remote acquisition exchange and linked with the input channels of the Data Logger, which in turn is linked by means of a modem to a storing and processing center through a commutated telephone network.

The environment monitoring telephone network system is based on the following functionalities:

- conversion of the analog measures provided by the N sensors in digital information;
- transmitting the digital information from the detecting and transmitting unit to the remote acquisition exchange; and
- reconverting the digital information into analog measures to input them to the Data Logger.

As an example of the aforementioned principle in the following section a preferred embodiment of the invention is described referring to the annexed drawings, in which.

In the Figures the telephone switched network which connects the acquisition exchange 7 comprising the Data Logger 5, to the storing data center 6 is shown by means of a dashed line while private telephone pair connections between the different cabinet/box 3 distributed on the territory and the acquisition exchange 7 with relative Data Logger 5 are shown by means of continuous lines.

Figure 1:
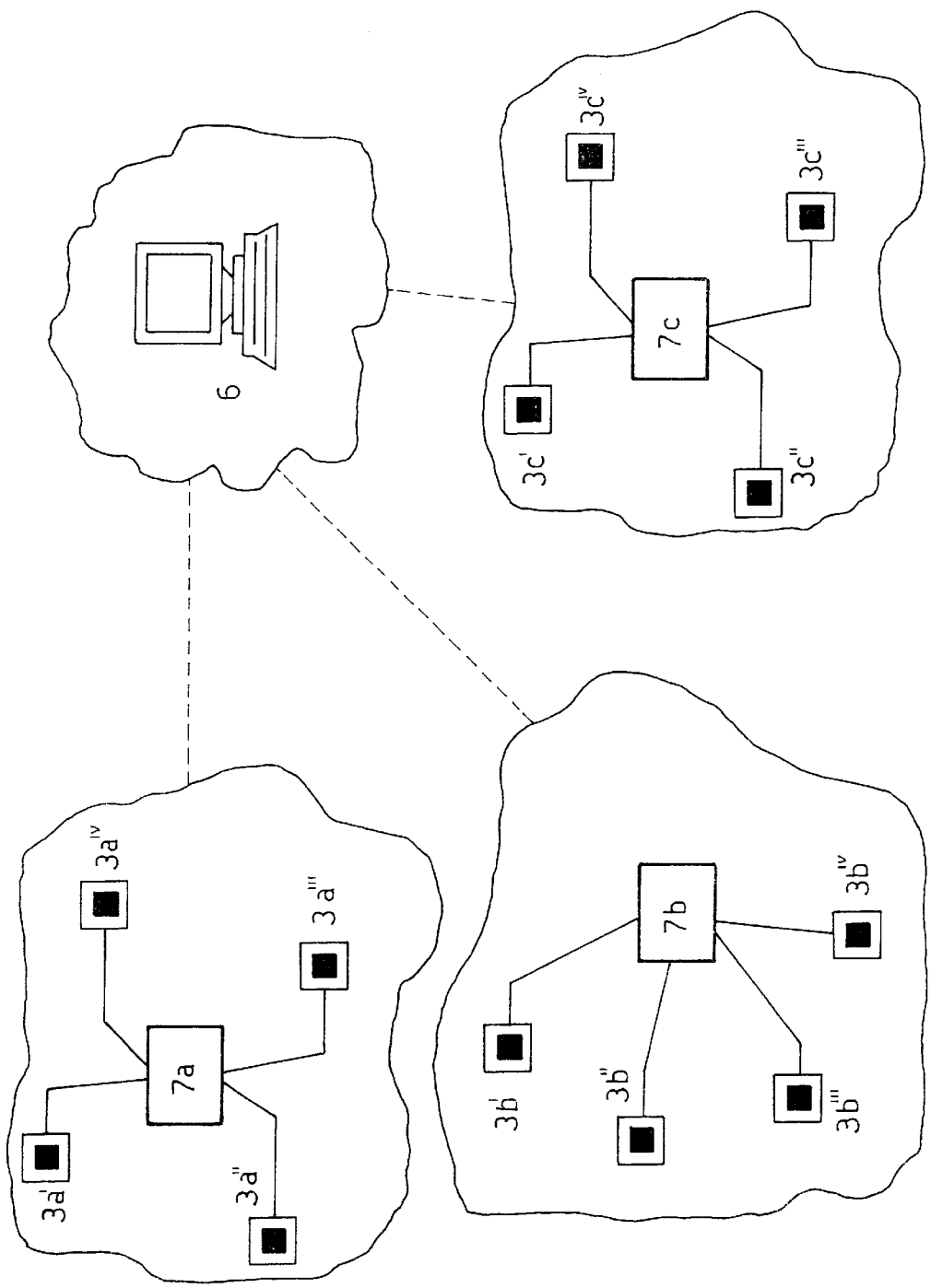
FIG. 1 is a schematic comprehensive view of the environment monitoring system according the present invention.
Figure 2:
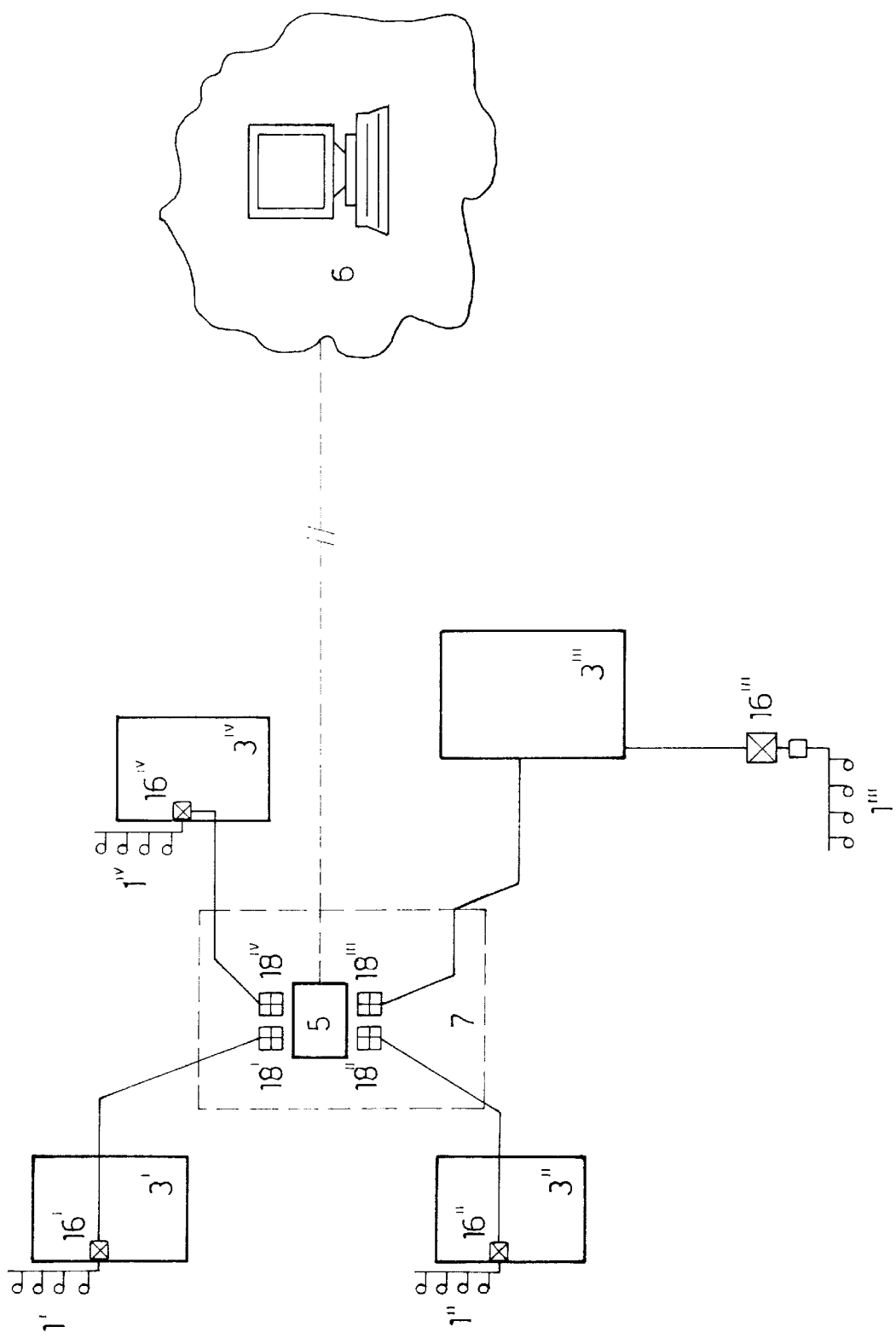
FIG. 2 is a schematic view of the system architecture based on the interface functionalities of a particular Data Logger.

Furthermore in FIG. 2 there is illustrated the sensor set 1 comprised in each cabinet/box 3 interfacing with the very detecting and transmitting unit 16. The latter is linked to the Data Logger 5 which in turn is provided with the receiving apparatus 18.

Each telephone cabinet/box 3 with relative sensors and the relative detecting and transmitting unit 16 is characterized by a compact shape and is able to detect various parameters in order to perform an environmental monitoring, i.e. CO, $SO_2$, $NO_2$, but also acoustic noise, moisture, temperature, etc.

In the present configuration it should be noted that for this kind of monitoring the telephone public network forms a valid support, since the economic value of the data acquisition means or Data Logger 5 affects substantially the cost of an acquisition station and its centralization makes the monitoring network economically less onerous without compromising its performances. Obviously the same principle can be applied on a local or geographic private telephone network without changing substantially the "scenario".

Therefore from an operative point of view it is possible to distinguish:

- a detecting and transmitting unit 16 to be installed inside the cabinet/box 3 transmitting to the acquisition exchange 7, on the private telephone pair, the measures provided by the sensor set; and an apparatus 18, to be installed into the acquisition exchange 7, remotely supplying through the telephone pair the cabinet/box electronics and receiving the data of the remote sensor set and sending the latter to the local Data Logger 5.

A certain maximum number of sensors 1, —which in the preferred embodiment could be four—are installed into each cabinet/box, this involves the following technical choices:

the detecting and transmitting unit 16 (in the following referred also as Tx-Sens) will be arranged so as to manage up to four analog input channels;

each cabinet/box 3 will be associated to a telephone pair for communicating data detected by the sensor set 1;

each cabinet/box 3 is managed in the acquisition exchange 7 by a second apparatus 18 (in the following referred also as Rx_Sens) located nearby the Data Logger 5 and connected to its analog input channels;

therefore to a certain number of cabinets/boxes 3 will correspond, in the acquisition exchange 7, the same number of Rx_Sens apparatuses 18, connected to the channels of a Data Logger 5, which is connected in turn (by means of a switched network) to a storing and processing data center 6, through a modem 19. It should be noticed that in FIG. 2 it has been set forth that a sensor set 1''' could be located in the very cabinet specifically remotely placed with respect to the distribution box 3'''.

The data acquisition means or the Data Logger 5 could be of a general purpose type. For each analog channel provided by the Data Logger the kind of measurement, the scale bottom, the detecting frequency and the data buffer dimension are programmable in an independent way. The data provided by each channel are locally stored with a frequency set according to a programmable size circular buffer; when this latter is full the data are downloaded to the computer of the Data Storing and Processing center 6.

A plurality of acquisition exchanges can be connected in a local network trough a bus 485 and the master exchange performs a further task with respect to the slave ones: managing the connection with the Data Storing and Processing Center.

Actually the data acquisition means (Data Logger) commercially available comprise at least 16 analog channels (this limit is due to the technical overload of their contemporary management), some Data Logger provide the possibility of an expansion to 32 channels by means of an additional hardware.

Considering the use of the 16 channel data acquisition means, it is possible to manage, by means of just one data acquisition means 16, sensors and so four maximum mode configuration boxes (four sensors for each one) or even more boxes not all of them configured with the maximum mode.

In order to further increase the number of boxes managed, it is possible to either include other data acquisition means at the exchange, or, if the Data Logger makes this possible, the number of its analog channels may be expanded.

Figure 3:
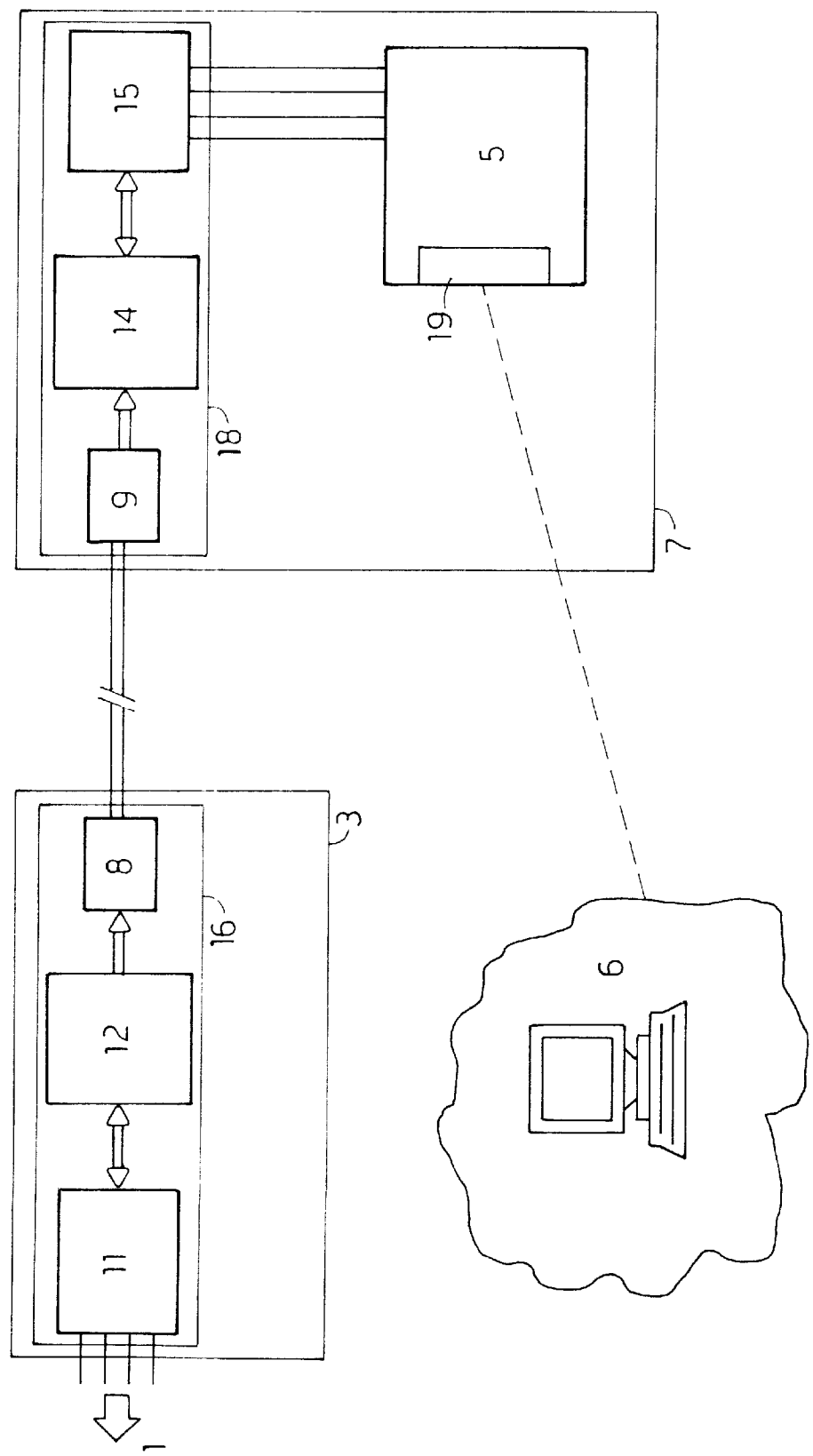
FIG. 3 is a schematic view of the environment monitoring system in a more detailed representation than FIG. 1.

With reference to the schematic view of the system shown in FIG. 3 its general functionalities are the following:

conversion of the voltage or current analog measures provided by the sensors 1 into digital data by means of the A/D converter 11;

communication of the cabinet to the acquisition exchange 7 of the digital information trough the hardware drivers 8 and 9, respectively, and by means of the microprocessors 12 and 14, with relative hardware and management software protocols;

reconversion through a D/A 15 converter of the digital information in analog measures to be provided to the Data Logger 5 (direct connection to its input channels).

In the context of a public telephone network using a telephone pair and a pair of Tx_Sens apparatus 16, and Rx_Sens 18 apparatus for each box, we may provide the telematic support to environmental monitoring networks which plan to use the peripheral cabinet/box of the telephone public network manager as acquisition stations (where to install the sensor set) and the telephone network exchange as the acquisition centers (where the Data Logger is located).

The drivers 8 and 9, which make possible to cover the specified distances (given that the acquisition times of the ambient parameters are in the order of ten seconds and the impulsiveness is null, the bit rate of data communication isn't a critical parameter) can be RS-485 transceivers with limited slew-rate.

In fact it's well known that to obtain "strong" links from the point of view of the right interpretation of data sent, it's essential to use balanced drivers so as to make as low as possible, the signal energy lost for EMI irradiance (a perfectly balanced driver provides for equal and opposite flows which do not irradiate magnetic fields).

The standard RS-485 transceiver satisfies these requirements but it has its limit in the line length guaranteed by the connection.

With low bit rates the most important problem is the voltage drop on the line, which causes a gradual reduction of the signal amplitude whit increasing distance.

In practice, using a telephone pair, usual RS-485 transceivers can reach, with a low bit rate (ten thousands bits per second), maximum distances of 1200 mt. So, our attention has been addressed to some special RS-485 transceivers with limited slew rate, which, being characterized by slower rise times at their outputs, would allow to cover longer connections. It has been possible to characterize the transceivers with tests aimed at estimating the possibility of using them in our system.

To perform the test it has been provided a pair of electronic cards (TX and RX) having on board the transceivers to be tested and moreover, an RS-232 interface dedicated to the data.

The instruments used have been the following:

data tester Aethra 7088 A 10 partitionable km of a 6/10 telephone pair (0,6 mm diameter), according to the SIP specification N-1033 and situated in the open air.

5 partitionable km of a 4/10 telephone pair (0,4 mm diameter) according to the SIP specification N-1240 and situated in the open air.

With the TX and RX electronic cards connected by a telephone pair, the data tester has been used (through RS-232 interface) to send the data to the TX card and so to analyse the data received from the RX card (unidirectional periodic transmission of a 512 bits frame pseudo-random pattern).

The set of tests were performed according to the following steps:

(A) Distance and speed transceiver limit test with the 6/10 telephone pair.

(B) Execution of some crosstalk tests with the 6/10 telephone pair;

(C) Distance and speed transceiver limit test with the 4/10 telephone pair;

(D) Distance and speed transceivers limit test, with a mixed connection (cables jump).

The results obtained can be summed up as follows:

in step (A) with a 10 km line length it has been possible to perform data links with up to 9600 bit/sec, characterized by a null error rate (the extreme conditions, without errors, have been 7 km 14400 bit/sec);

in step (B), through ISDN and ring-signal interferences (application of one specific noise at a time) with a 10 km line length it has been possible to perform data links with up to 7200 bit/sec, characterized by a null error rate;

in step (C) with a 5 km line length it has been possible to perform datalinks with up to 14400 bit/sec, characterized by a null error rate;

in step (D) the connection, comprising a 3 km 4/10 telephone pair, a 4 km 6/10 telephone pair and a 2 km 4/10 telephone pair, allowed to perform data links with up to 4800 bit/sec, characterized by a null error rate (at 7200 bit/sec it has been measured an error rate—given by the ratio mistaken bits/received bits—, =0,4).

The positive results provided by the tests, interpreted with caution (since account should also be taken of the line variables "on the field", including attenuation related to climatic conditions, and non-simulated noises), allow to define a typology of transceivers which assure, in the preferred embodiment according to the present invention, the right unilateral data communication, for maximum distances of 5 km with a bit rate lower or equals to 2400 bit/sec.

Figure 4:
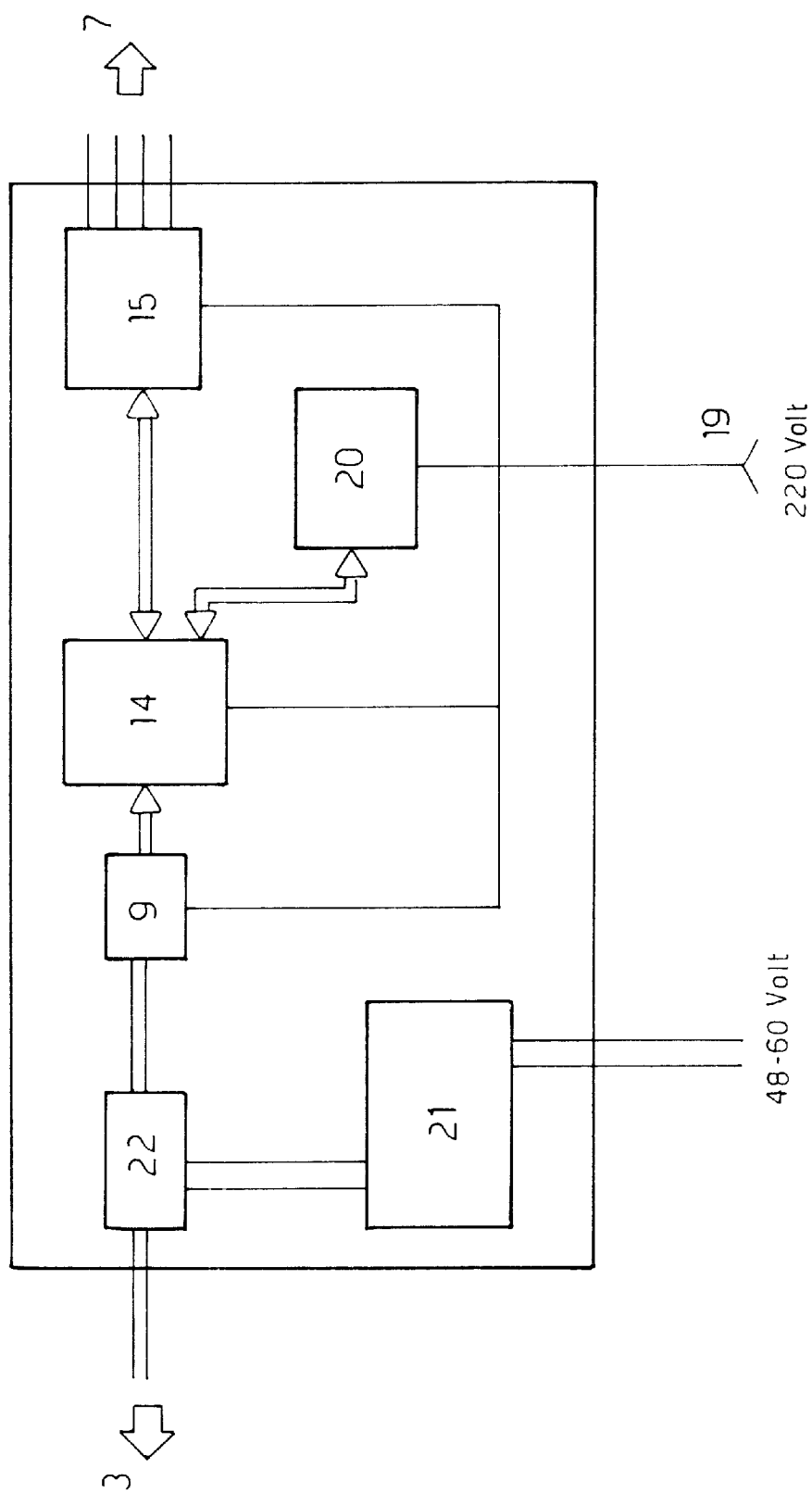
FIG. 4 is a block diagram concerning the receiving apparatus comprised in the detected data acquisition exchange.

The Rx-sens 18 apparatus (system device interfaced to the exchange) is made by an electronic card which, as shown in FIG. 4, provides the following connections towards the external devices:

connection with 48–60 volt voltage available in the telephone network exchange in order to remotely supply cabinet/box circuits and devices;

connection with an external power supply from the power line (for example 9 volt, 300 mA) or with the direct voltage provided by the Data Logger 5 in order to supply devices on the electronic card;

connection with the telephone pair specifically provided for the system, in order to receive data detected in the cabinet/box 3;

connection with analog channels of the Data Logger 5 in order to transmit data remotely received to this latter.

In the schematic view of the electronic card the following blocks are set forth:

a microprocessor 14 (for example a 8 bit, Intel 8051) with an internal RAM memory;

an Eprom 20, on which the firmware managing the apparatus is stored;

a digital/analog converter 15 with four output channels (12 bit resolution needed for the continuous output sensors, but redundant for the threshold detectors);

a receiver driver RS-485 9 characterized by a limited slew-rate;

a DC/DC converter 21 suitably sized in order to remotely supply the cabinet/box electronics;

a line interface 22, employed for providing through the telephone pair, the supply direct voltage (towards the remote electronics) and the data signal.

The configuration of the Tx-sens unit 16 (system device interfaced to the cabinet/box) considers the possibility that the system can supply autonomously the sensor set 1 placed near every cabinet/box.

In compliance with the distance and power absorption—if they are both limited—it is provided a direct power supply from the acquisition exchange 7, overdimensioning the section of the telephone pair and raising the voltage level available in the telephone exchange, without any other power supply located in the peripheral apparatus 16.

To support at the best this kind of necessity, in the most critical cases, the Tx-sens unit 16 can provide a specific contribution. It is supplied by a recharge battery and is programmable for having a discontinuous operative cycle, so as to absorb in the activity periods a power superior to that provided by the tele-supply. For example if in a cabinet it is provided a 1,5 Watt power but the local apparatus (Tx-sens 16 and sensor set 1) needs 3 Watt, then we can think to make three apparatus work for a period "T" and make them not operative for a period "2T", cyclically, so that in the inactivity period the energy used in the activity period can be completely stored (battery recharge that provides the power supply for the apparatus, through tele-supplying).

If the cabinet/box apparatus would require 6 Watt, and 1,5 Watt would be again the available power, every period "T" of activity should be followed by an inactivity period="4T".

This approach, ideally extensible infinitely, has its obvious limitation in the reduced usefulness of the collected data.

First of all the operative period must be longer than the sampling time of the exchange Data Logger by a factor $\geq 3$, (at least three samples of the controlled parameter, processable for every operative period) and in practice it has been ascertained that the inactivity period cannot be longer than five times the operative period.

During the inactivity of the cabinet/box apparatus, the Rx-Sens apparatus 18 (which is no longer receiving data) sets the output of its D/A converter 15 to a value which is considered out of range by the Data Logger 7, so that sampled values, during the not operative period, are not accepted and do not affect processes executed by the Data Storing and Processing Centre 6.

Figure 5:
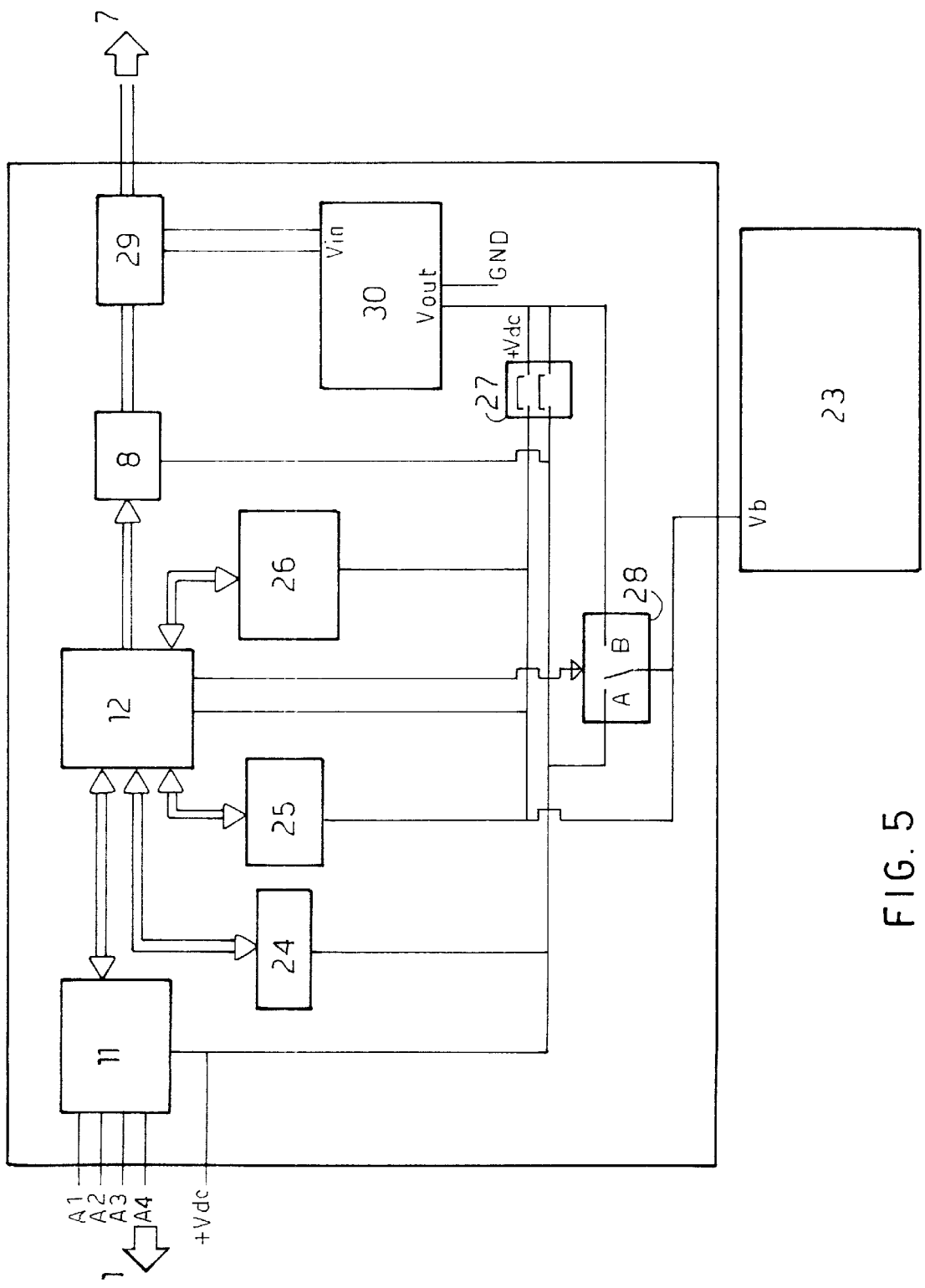
FIG. 5 is a block diagram concerning the environmental data detecting and transmitting unit.

The Tx-Sens apparatus 16 as shown in FIG. 5, comprises the following connections :

a connection to the system private telephone pair by means of which measures detected by the sensor set 1 are transmitted and the power supply provided by the remote Rx-Sens apparatus is received;

a connection to the sensor set 1 in the preferred configuration (in number of 4), to acquire locally its analog measures and in case to supply it;

an optional connection to a rechargeable battery 23 in order to provide for the possibility of a discontinuous operation mode.

Further, the following blocks are also shown:

a microprocessor 12 ( for example 8 bit, 8051 Intel family), provided with an internal RAM memory ;

an Eprom memory 26 storing the firmware managing the apparatus;

a digital-to-analog converter 11 (12 bit resolution, needed for continuous output sensors, but redundant for threshold detectors) with 4 input channels;

a transmission driver RS-485 8 characterized by a limited slew-rate;

a line interface 29 receiving remote direct voltage through the telephone pair and transmitting the data signal;

a DC/DC converter 30 of suitably size to supply the devices on the electronic card and, in case, the sensor set;

a double jumper 27, closed (on) to perform direct standard functionality, (devices always supplyed), and opened (off) to perform the discontinuous optional functionality, and a clock 25, selector switches 24 and a controlled double throw switch 28, to be employed with the external battery 23 to perform the discontinuous optional functionality. According to the operative point of view, the apparatus cyclic operation in the discontinuous way is founded on the following steps:

the microprocessor 12 reads from the selector switches 24, which have been previously mannually set, if to activate or not discontinuous operation modality, and in case it reads also the activation period and the cycle factor (from which it gets the not operative pause time);

setting the shunt 28 in the position denoted by "A", the microprocessor 12 starts the operative period of the cabinet/box apparatus, which are directly supplied by the external battery 23;

by means of the clock 25, initially programmed according to the readout of the switch 24, the microprocessor is informed of the time termination of the operative period and consequently sets the shunt 28 into position "B" (disabling the sensors and most of the electronic devices on the electronic card, besides setting into recharge the battery ) and sets itself in a power-down not operative position;

the microprocessor 12 is activated by the clock 25 at the inactivity period termination and consequently drives the shunt 28 to be set back into position "A" (supplying again the sensor set 1 and all the electronic devices on the electronic card by means of the battery 23).

The system described is independent of the monitoring devices employed assuring its functionality with any kind of acquisition means provided with analog input channels (Data Logger, PC acquisition card, etc.).

Furthermore it is independent of the kind of monitored environmental parameters allowing its employment also in embodiments different from those described.

In the practical embodiment the connection is performed employing the usual telephone twisted pair, which covers long distances and is supported from the energetic point of view by standard -not specifically dedicated- resources of the public telephone network.

What is claimed is:

1. Environment monitoring telephone network system characterized in that it comprises:

a plurality M of environment parameters detecting and transmitting units (16) linked with a remote acquisition exchange (7), each of said units being provided with N analog input sensors;

at least a telephone network private line for each detecting and transmitting unit, in order to transmit detected data to the remote acquisition exchange (7) where is located a Data Logger (5) and to supply remotely the detecting and transmitting unit (16);

a plurality M of receiving units (18), each being provided for the interconnection with a specific detecting and transmitting unit (16), said receiving units (18) being located at the remote acquisition exchange (7) and being linked with the input channels of the Data Logger (5), which in turn is linked, by means of a modem, to a storing and processing center, through a switched telephone network (6), each said peripheral detecting and transmitting unit (16) further comprising:

I—an analog-to-digital converter (11);
    II—a transmission driver (8);
    III—a line interface (29) receiving through the telephone pair the remote direct voltage and transmitting the data signal; and
    IV—a DC/DC converter (30) of suitable size in order to supply the devices on the electronic card and the sensor set;
    V—a double jumper (27), which is closed to perform a continuous mode functionality with the devices continuously fed, and which is open when it is desired to perform a discontinuous mode optional functionality, so that the apparatus are cyclically supplied and not supplied;
    VI—a clock (25), selector switches (24) and a controlled double throw switch (28) to be employed with the external battery (23) to perform the discontinuous mode optional functionality.

2. Environment monitoring telephone network system according to claim 1 characterized in that each receiving apparatus (18) located in the remote acquisition exchange (7) includes:

I—a microprocessor (14) with an internal RAM memory;
    II—an EPROM memory (20) storing the firmware managing the receiving apparatus;
    III—a digital-to-analog converter (15);
    IV—a receiving driver (9);
    V—a DC/DC converter (21) remotely supplying the detecting and transmitting units (16);
    VI—a line interface (22) providing through the telephone pair a power supply direct voltage and the data signal.

3. Environment monitoring telephone network system according to claim 1 characterized by using limited slew rate RS-485 transceivers, set at a reduced bit-rate as drivers for transmitting data between the detecting and transmitting units (16) and the receiving apparatus (18).

4. Environment monitoring telephone network system according to claim 1 characterized by locating the remote acquisition exchange (7), comprising the relative Data Logger (5), into the telephone exchange of a public telephone network, and the detecting and transmitting units (16) either into the box or into the cabinet or, in any case, at the end user termination of the public telephone network.

5. Environment monitoring telephone network system according to claim 1, characterized by using the infrastructures of the public telephone network as means for transmitting data received from the detecting and transmitting units (16).

6. Environment monitoring telephone network system according to claim 1, characterized in that the infrastructures of a private geographical telephone network are used as means for transmitting data received from the detecting and transmitting units (16).

7. Environment monitoring telephone network system according to claim 1, characterized in that the infrastructures of a local telephone network are used as means for transmitting data received from the detecting and transmitting units (16).

8. Environment monitoring telephone network system according to the claim 1, characterized in that the autonomous power supply of the sensor set (1) in the detecting and transmitting unit (16) is obtained by using a rechargeable battery (23), said detecting and transmitting unit (16) being programmed for a discontinues cyclical activation, in order to recover and store energy during the inactivity period, and to supply this energy in the activity period.

* * * * *